July 22, 1941.　　　C. A. MARTIN　　　2,249,844
CONTROL SYSTEM
Filed April 1, 1937　　　3 Sheets-Sheet 1
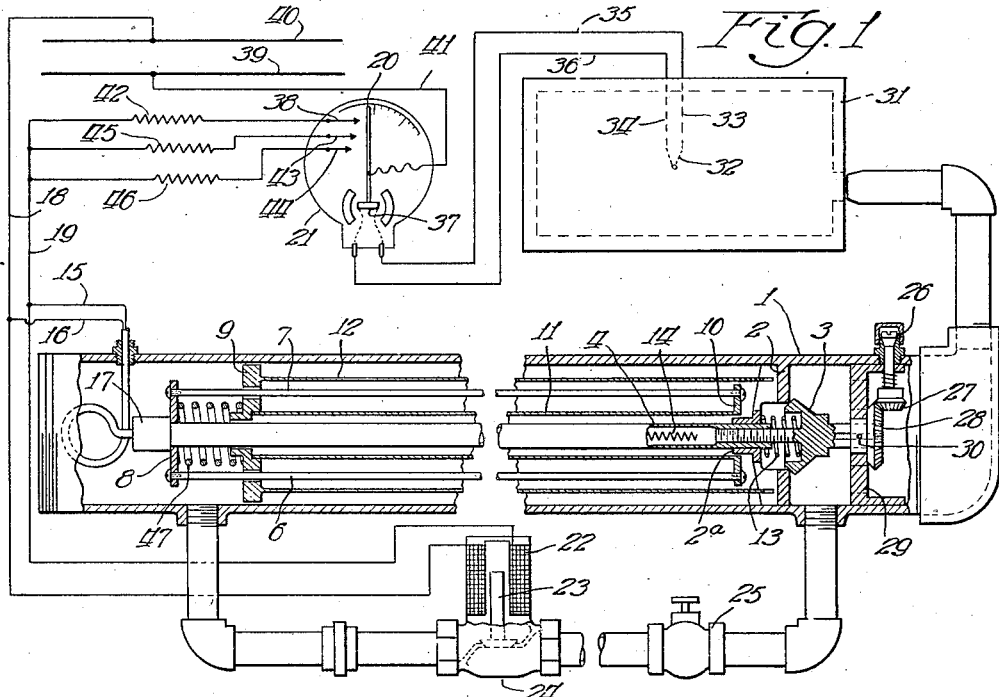
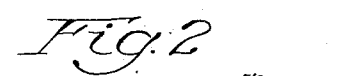
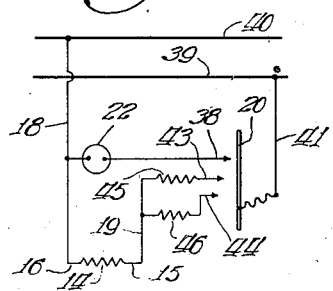
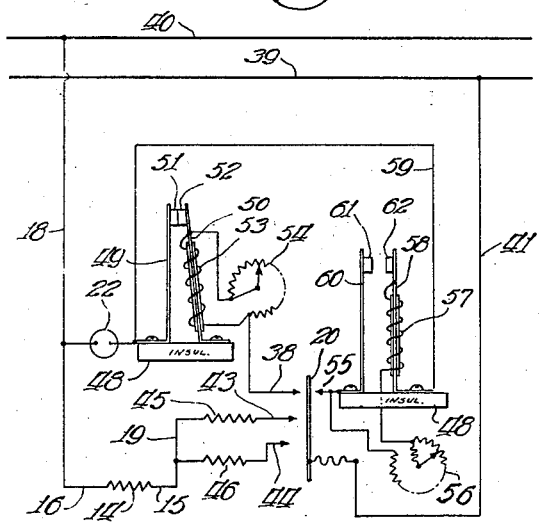
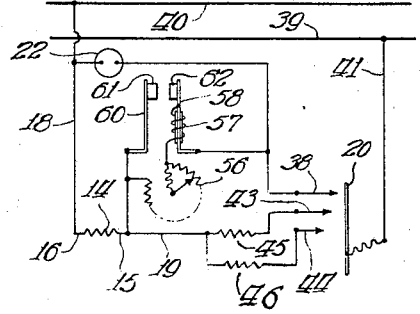
Inventor:
Charles A. Martin
By: Zabel Carlson & Wells
Attys July 22, 1941.  C. A. MARTIN  2,249,844
CONTROL SYSTEM
Filed April 1, 1937  3 Sheets-Sheet 2

Inventor:
Charles A. Martin
By: Zabel Carlson Wells
Attys.

July 22, 1941.  C. A. MARTIN  2,249,844
CONTROL SYSTEM
Filed April 1, 1937  3 Sheets-Sheet 3

Inventor:
Charles A. Martin
By Zabel Carlson & Wells
Attys.

Patented July 22, 1941

2,249,844

UNITED STATES PATENT OFFICE 2,249,844

CONTROL SYSTEM

Charles A. Martin, Chicago, Ill.

Application April 1, 1937, Serial No. 134,448

8 Claims. (Cl. 236—68)

The present invention relates to a system of control or regulation and has for its principal object the provision of a control system by means of which it is possible to vary the quantity of a material such as fuel, for example, necessary to maintain a predetermined condition or temperature in accordance with a varying demand for the material. Control systems of this character find their utility in such devices as automatic temperature control devices where fuel is supplied to hold a predetermined operating temperature. It has always been a difficult problem to obtain fuel variations to correct temperature variations in such a way as to avoid the lag between the change in temperature and the change in fuel. This lag is an accumulative one since it is a result of natural failure of the fuel to immediately correct the temperature change. In other words, a change from the predetermined desired temperature is necessary to cause a change in fuel supply and it is some little time after the change in fuel supply occurs before the change in temperature caused thereby takes place.

The present invention contemplates an improved and simplified means by which quick changes of small magnitudes are made in the quantity for maintaining the predetermined control condition. Coupled with this quick change means the invention utilizes means for making slower changes in the quantity to substantially balance the quantity against the demand.

More specifically, the present invention contemplates the utilization of timing devices operable to temporarily retard or speed up the action or effect of a control mechanism controlling the quantity, or a part of it, upon failure of the quantity to maintain a predetermined condition. In this connection means are provided for changing the characteristics of the timing devices.

The present invention may be embodied, for example, in a system of automatic control of temperature of a furnace in which failure of the fuel supply to hold a predetermined operating temperature is utilized to effect the operation of a mechanism for changing the fuel in-put to the furnace. The control instrument may be so arranged that when the fuel supply fails to hold the predetermined temperature the instrument completes an electrical circuit which energizes a fast operating valve controlling the supply of fuel and a slower acting valve also controlling the supply of fuel. The snap action of the quick operating valve causes an immediate change in the quantity of fuel which is quickly reflected in stopping further action by the temperature responsive device. The quick acting valve controls only a small fraction of the total fuel under control. Now assuming that the temperature responsive device is quickly responsive to the change made by the quick acting valve, and assuming further that the quantity of fuel controlled by the slow acting valve nearly balanced the heat losses, prior to operation of a quick acting valve, it is evident that the temperature under control will change so rapidly that the control instrument will break the circuit of operation for both valves, thereby closing the quick acting valve and leaving the slower acting valve in a position only slightly more open than it was prior to operation. This is because of the short interval of time in which the slower acting valve is energized.

If the fuel supplied is still insufficient to hold the operating temperature both valves are again energized to open. On the other hand, if the fuel supplied is sufficient to hold the operating temperature, the circuits to both valves remain open.

Other and more specific features and advantages of the invention will appear as the description proceeds, reference being had to the accompanying drawings wherein a preferred form of the invention is shown. It is to be understood, however, that the drawings and description are illustrative only and are not to be taken as limiting the invention except in so far as it is limited by the claims.

In the drawings:

Figure 1 is a sectional view through a thermal expansion valve and includes diagrammatically the control mechanism for the valve.

Figure 2 is a fragmentary diagrammatical view of the portion of the wiring diagram shown in Figure 1 and illustrates a modified electrical circuit.

Figure 3 is a fragmentary view of a portion of the wiring diagram illustrating a further modified form of the circuit.

Figure 4 is a fragmentary view illustrating a slightly modified form of the electrical circuit utilized in the systems shown in Figure 1.

Figure 5:
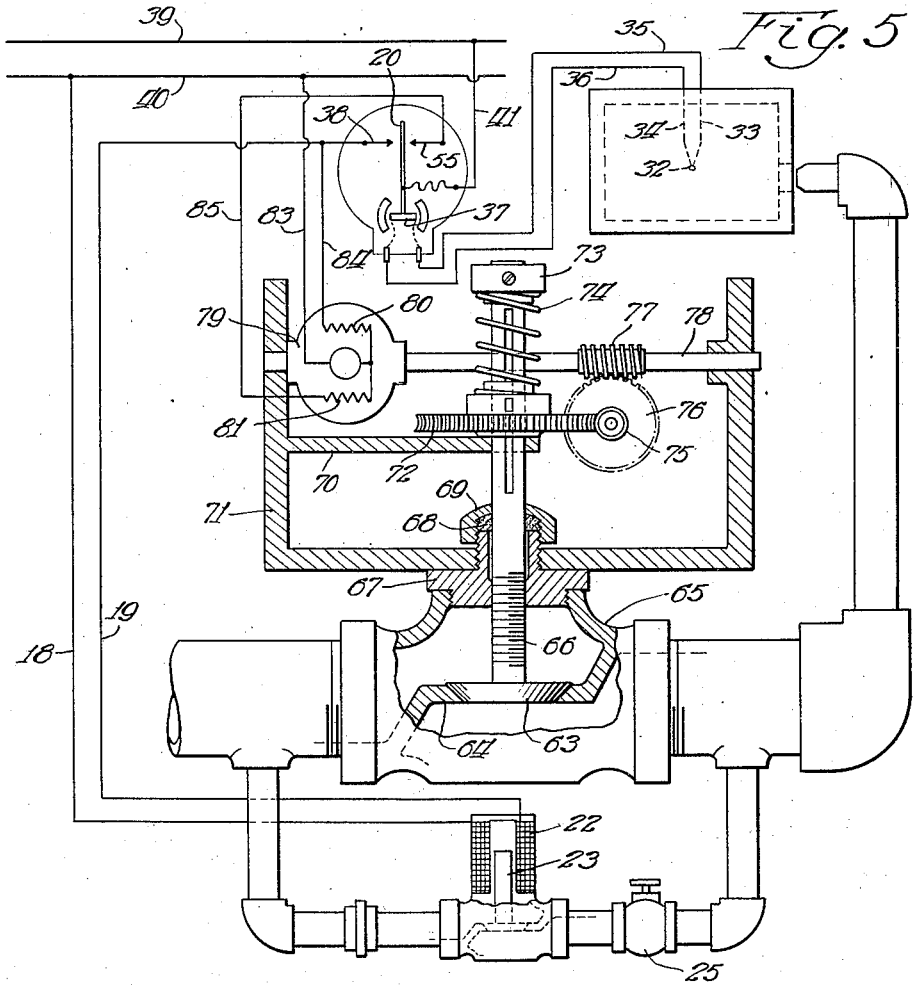
Figure 5 is a view similar to Figure 1, illustrating the invention applied to a motor driven valve.

Referring now in detail to the drawings, the structure shown in Figure 1 utilizes an electrically operated thermal expansion valve such as is described in my Patent Number 1,697,432, but of an improved design. In the improved valve two expanding elements are heated instead of one by the electric heat element controlled by the temperature controller. These elements are so assembled so as to give a valve stroke equal to the sum of their expansions. Compensating expansion elements, for both of the electrically heated expansion elements, compensate for the surrounding temperature of the heated elements.

A thermocouple 32 responds to the temperature change within the furnace and operates a millivoltmeter measuring instrument 21, provided with a temperature scale and a pointer 20. The instrument is also provided with electrical contacts 38, 43 and 44 adjustable to operate within the range of temperature control and operable by the instrument to control the flow of electrical current through resistances to both the thermal expansion valve and the solenoid valve to change the flow of fuel to the furnace. The thermal expansion valve has a tube case 1 having threads on each end. The threads on the left end of the tube connect to the fuel supply line, whereas, the threads on the right end of the tube connect through suitable pipe fittings to the burner of a furnace 31. Within the tube case 1 a valve seat 2 is sealed, having a circular solid section except for the valve opening and ribs supporting a hub 2a. The opening in the seat is closed, or throttled by a valve 3 having a threaded extension to the left and a key-slotted extension to the right. The threaded extension screws into a threaded plug sealed to the end of an operating tube 4 having a positive coefficient of thermal expansion. The other end of the operating tube 4 is sealed to a circular disc 8, and the disc 8 is fastened to a pair of compensating rods 6 and 7 by means of screws. The rods 6 and 7 have a positive coefficient of thermal expansion equivalent to the operating tube 4 and are slidable through holes in a support bar 9. The other ends of rods 6 and 7 are attached to a circular disc 10 by means of screws. The disc 10 is slidable over the hub 2a of the valve seat 2 and is sealed to a secondary operating tube 11 having a positive coefficient of thermal expansion also equivalent to operating tube 4. The opposite end of tube 11 is sealed to the bar 9. Also sealed to bar 9 is a compensating tube 12 which also has the same coefficient of thermal expansion as operating tube 4. The other end of compensating tube 12 slides into slots in the ribs of the valve seat 2 and is held in a fixed position both by the pressure of fuel against the under side of valve seat and by the pressure exerted by the spring 13. Within the operating tube 4 is an electrical heating element 14 wound on a nonconducting frame insulating it from the tube 4. The terminals 15 and 16 of the heating element are protected with flexible lead tubing, within the valve case 1, which is sealed to the cap 17, which in turn is sealed to the operating tube 4, making a fluid-tight seal throughout. The lead cable extends through a stuffing box screwed into the valve case 1. Terminals 15 and 16 connect to the power lines 18 and 19 and the current through the lines is controlled by the position of the pointer 20 of the temperature controller 21. Electrical current through the heater 14 causes a rise in temperature of the tube 4, expanding it and increasing its length. The free end of tube 4 into which the threaded stem of valve 3 is screwed moves to the right, sliding through the guide hole in the hub of the valve seat 2, and pushes the valve 3 away from its seat to increase its opening. Heat dissipated by the operating tube 4 increases the temperature of the secondary tube 11 which also expands to increase its length. The free end of this tube slides over the hub of the valve seat 2 to the right and moves the disc 8 and the operating tube 4 attached to it to the right to give the valve 3 a further opening; that is, the opening of valve 3 equals the sum of the expansion of tubes 4 and 11 due to the electrical heating effect. The compensating rods 6 and 7 and the compensating tube 12 are completely surrounded by the fluid under control and respond to its temperature. A rise in temperature increases the length of both the rods and tube which move the valve 3 to the left in the direction to close it to compensate for the heating effect of the fluid under control on the tubes 4 and 11 which operate the valve 3 to the right in a direction to open it. The magnitude of opening of valve 3 is, therefore, proportional to the sum of the difference in temperatures between the operating tubes 4 and 11 and the compensating elements comprising the rods 6 and 7 and the tube 12. When the current to the heater 14 is disconnected the operating elements 4 and 11 decrease in temperature to move the valve 3 in the direction to close it. If the operating elements are allowed to cool to the same temperature as the fluid under control the valve 3 attains its original manual adjustment regardless of whether there has been a change in the temperature of the fluid under control. If for a particular control operation it is desired to have a greater opening of the valve 3 for higher fluid temperatures, to compensate for the expansion of the fluid, the compensating elements are made of material having a lower coefficient of thermal expansion. A spring 47 is used to provide protection for the valve mechanism should the valve 3 be adjusted to seat itself before the operating elements had cooled to the surrounding fluid temperature. The spring keeps the disc 8 against the screw heads in the rods 6 and 7 under normal operating conditions. If the valve seats and there is further contraction of the operating elements the disc 8 is pulled forward against the spring pressure and slides on the rods 6 and 7.

Manual adjustment of the valve 3 is obtained by turning an adjusting stem 26. Attached to the stem is a pinion gear 27 which is held in mesh with a bevel gear 28 by a bracket 29. In the hub of the bevel gear 28 is a key 30 which extends into the key-slot of the stem of valve 3. Rotation of the screw head adjusting stem 26 in a clockwise direction turns the valve 3 in the same direction and screws its threaded extension into the threaded plugged end of the expansion tube 4 to move the valve in a direction toward the seat to close it. To open the valve 3 the screw head adjusting stem 26 is turned in a counterclockwise direction. Valve 3 is, therefore, manually adjusted to either a closed position, or slightly open position. In the latter case the fuel admitted to the furnace 31 must be insufficient to maintain the operating control temperature.

Power lines 18 and 19 also connect to a coil 22 of a solenoid valve 24 having a plunger 23. The solenoid valve 24 is in a by-pass around the main valve 3 and seat 2 of the thermally controlled expansion valve. In the by-pass line another hand operated valve 25 limits the flow through the by-pass when the solenoid operates.

The sequence of operation is as follows:

When the control instrument contact 20 is in the position shown, no current flows to either the heater 14 of the thermally controlled expansion valve or the coil 22 of the solenoid valve 24. Left in this position the solenoid valve 24 will be closed and the valve 3 of the thermally controlled expansion valve will be in a position depending on the original manual adjustment of the screw head adjusting stem 26. Upon failure of the fuel supplied to hold the operating temperature, resulting in a decrease in temperature, the milli-voltage of thermocouple 32 decreases. This causes a corresponding decrease in current through the elements 33 and 34 of the thermocouple, the leads 35 and 36 and the coil 37 of the measuring system allowing the pointer 20 to move to the left and contact with the instrument control contact 38. Electric current is then supplied to both the heater 14 of the thermally controlled expansion valve and the coil 22 of the solenoid valve 24 from the main power lines 39 and 40. From power line 39 the circuit will be completed through lead 41, pointer 20, contact 38, resistance 42, lead 19, through lead 15, heater 14 and lead 16, to lead 18 which connects with the other power line 40. The circuit is also completed from lead 19, through coil 22 of the solenoid, and lead 18 to the power line 40. The resistance 42 is low enough to permit the solenoid to operate. The instant contact is made between pointer 20 and contact 38 the coil 22 of the solenoid 24 lifts the valve plunger 23 and permits fuel to pass through the by-pass piping to the burner of the furnace 31. This rapid increase in fuel to the furnace will under ordinary conditions cause a rapid change in the temperature of thermocouple 32, increasing its millivoltage and operating the pointer 20 to the right to break the circuit between pointer 20 and contact 38 to immediately close the solenoid. At the same time the circuit through the heater 14 is also broken. Due to the rapid action of the solenoid causing the short period of operation, the increase in the opening of the slower operating valve 3 would only be slight, and after the solenoid closed the flow of fuel through valve 3 would not cause the temperature to continue to rise under ordinary conditions. On the other hand, if the heating operation changes and requires a greater average demand for fuel, pointer 20 will remain in circuit with contact 38 a greater length of time and permit valve 3 to attain a greater opening to furnish a greater average fuel in-put to approximately balance the new demand. Additional contacts 43 and 44 adjusted to operate at temperatures below the control temperature also complete the power circuit to the valve through the pointer 20 and resistances 45 and 46 to give a further incerase in current through the heater 14 to open the valve 3 faster when the temperature drops excessively, or to bring a cold charge, or cold furnace, within the operating temperature control range at a faster rate.

Figure 2 shows a modified electrical circuit. Like numbers are identical to the parts shown in Figure 1. With this method of wiring, the solenoid valve only is operated at the control temperature, whereas the thermally controlled expansion valve is operated at temperatures somewhat below the control temperature setting. The principal benefit of using the slow operating thermal expansion valve and fast operating solenoid valve in this manner is to obtain a quick shut-off of fuel if the temperature exceeds the control temperature and a quick in-put of fuel if the temperature drops below the control setting. This will prevent a series of back fires, which may be obtained wtih a slow operating valve on operations where the fuel has to be shut off completely to prevent over-shooting of the control temperature. This method of wiring is also preferred on batch heating operations where there is considerable lag between fuel in-put and temperature response.

Figure 3 differs from Figure 2 in that my thermally controlled switches are included in the circuit for operating the solenoid valve and an additional contact is added to the control instrument to close when the temperature exceeds the operating control temperature. Like numbers also correspond to the respective parts of Figure 1. In circuit between contact 38 and the solenoid coil 22 is a thermally controlled switch having a base of non-conducting material 48. Mounted on the base are two strips of bimetallic metal 49 and 50 having contacts 51 and 52 which are normally closed. Connected to the bimetallic strip 50 is one terminal of a heating element 53 which is otherwise insulated from the strip. In parallel with the heating element is a rheostat 54 and the other terminal of heating element 53 connects to the contact 38 of the instrument. When the temperature drops below the control temperature, contact is made between the pointer 20 and contact 38 which operates the solenoid valve coil 22 to open the valve. As the current for operating the valve coil 22 passes through the heating coil 53 in parallel with the rheostat 54 the temperature of the bimetallic strip 50 will rise and cause the strip to bend to the right and break the circuit between contacts 51 and 52 causing the solenoid to close. As the circuit through the heating coil 53 is also broken the temperature of the bimetallic strip will drop and again close the contacts 51 and 52 to open the solenoid provided the contact 38 and pointer 20 are still engaged. The effect is to add sufficient fuel to the furnace in-put to prevent a continued drop in temperature, then reduce the average fuel in-put to prevent over-shooting of the temperature on the rise, independent of any further change in temperature of the furnace. The time required for operation of the switch is controlled by the position of the rheostat contact which determines the shunting effect of the rheostat. This position, in turn, is determined by the lag characteristics of the furnace. Contacts 43 and 44 are adjusted to operate somewhat below the control temperature, as illustrated in the previous figures. Upon a rise in temperature of the furnace above the control setting, contact is made between the pointer 20 and the contact 55. This sends current through the rheostat 56 in series with the high resistance heating coil 57 having one terminal connected to the bimetallic strip 58, thence through lead 59, through the solenoid coil 22 and lead 18 to the other side of the line 40. Due to the high resistance of the coil 57 and the fact that the thermally operated switch is normally open, the solenoid will not operate. However, the heating coil 57 increases the temperature of the bimetallic strip 58 causing it to bend to the left and make contact with the bimetallic strip 60 through the contacts 61 and 62 to short circuit the rheostat 56 and heating coil 57 to operate the solenoid valve coil 22 to open the valve. As the heating coil 57 and rheostat 56 are short circuited the temperature of the bimetallic strip 58 drops and the contacts 61 and 62 separate to close the solenoid valve. This operation will then be intermittent as long as the pointer 20 is in contact with the contact 55 of the control instrument. The result is that when the furnace temperature first exceeds the operating control temperature the fuel in-put will be less than it will be after the control contacts have been closed sufficient time to operate the thermally controlled switch. The effect is to prevent a rise above temperature by an excessive decrease in fuel input and then add fuel to prevent too rapid a drop in temperature, independent of any further change in temperature of the furnace. Rheostat 56 is adjustable to vary the rate of heating of the bimetallic strip 58, depending on the lag characteristics between fuel in-put and temperature responses.

Figure 4 shows a modified form of the electrical circuit and includes a normally open thermally operated switch in circuit with the slow operating thermally controlled expansion valve. The purpose of this method of operating the valves is to introduce a lag in the operation of the thermally controlled expansion valve when the furnace temperature drops and causes the contact pointer 20 to connect with the contact 38. When this occurs the solenoid operates immediately to increase the fuel in-put to the furnace. Now, if there is some lag between furnace fuel in-put and temperature response, the fuel controlled by the solenoid will have time to cause the temperature to rise before the thermally controlled switch contacts operate to apply any appreciable current to the thermally controlled expansion valve. On the other hand, if the fuel in-put controlled by the solenoid is insufficient to cause the temperature to rise above the control temperature the thermally operated switch closes its contacts to increase the electric current through the thermally operated expansion valve to increase its opening and add additional fuel to the furnace. The operation of this thermally controlled switch is identical to the normally open one shown in Figure 3 and already described.

Figure 5 illustrates another form of applying my invention. The primary difference between this form and that illustrated by Figure 1 is that the slow operating thermal expansion valve 3 of Figure 1 is replaced by a slow operating differential electric motor driven valve 63. To operate the motor driven valve a somewhat modified wiring diagram is, of course, required. The differential electric motor is the type that has one common terminal connected to one side of the line voltage, and two additional terminals arranged so that when alternately connected to the other side of the line voltage will operate the motor in opposite directions. Like numbers are used for identical parts. In Figure 5 the valve 63 controls the port opening in the seat 64 of the valve body 65. The valve stem 66 has a threaded portion which screws into the inside thread of the valve housing nut 67, a smooth portion that extends through the upper part of nut 67, the packing 68 and the packing nut 69, and a key-slotted portion that extends through the support 70 of the frame 71 and the hub of gear 72. Attached to the upper end of the key-slotted stem is a collar 73 and between the collar and hub of gear 72 is a spring 74 which keeps the gear 72 against the support 70. In the hub of gear 72 is a key which extends into the key-slotted stem, so that rotation of the gear rotates the stem in the same direction. In mesh with the gear 72 is the worm drive 75 which in turn is attached to the motor shaft 78 so as to operate the valve 63 through the train of gears whenever the motor is operated. The motor 79 is mounted to the support 70 and the frame 71 supports the motor shaft 78. Frame 71 in turn is screwed onto the valve housing nut 67 to complete the assembly. The motor 79 has the field coils 80 and 81 and the armature 82. One terminal 83 of the armature 82 connects to the power line 40. The other power line 39 connects to the lead 41 which connects to the pointer 20 of the temperature controller having the contacts 38 and 55. When the temperature of the furnace falls below the operating control temperature contact is completed between the pointer 20 and contact 38 to complete the power circuit through the lead 84 and field coil 80 to the other terminal of the armature. This rotates the motor in the direction to open the valve 63. At the same time the power circuit is completed through the coil 22 of the solenoid valve, through the leads 18 and 19, to open it and admit fuel to the furnace through the by-pass around the motor driven valve 63, in the same manner as fuel is admitted through the by-pass around the valve 3 illustrated in Figure 1. If the temperature responsive device is quick to respond to the increased fuel in-put the pointer 20 will swing to the right to break the electrical circuits to both valves before the valve 63 has time to be operated in the direction to open it any appreciable amount. Ordinarily, when the solenoid closes, the fuel in-put through valve 63 will approximately balance the heat losses and the temperature of the furnace will change rather slowly, which prevents the tendency to hunt. When the temperature of the furnace rises above the control temperature contact is made between the pointer 20 and the contact 55 which passes current through the lead 85 and motor coil 81 to one side of the armature 82 and and then through the armature and lead 83 to the other side of the line to complete the circuit and slowly operate the valve 63 in the direction to close it. Now, if the demand for fuel is reasonably constant the position of valve 63 will remain rather constant, while the solenoid valve is operated to furnish the small variation in fuel in-put to maintain accurate temperature control. Should the fuel demand change considerably, especially beyond the limits handled by the solenoid valve, the interval of operation of the motor driven valve would be greater and, consequently, make a greater change in the position of its valve to establish a new normal flow of fuel.

Figure 6:
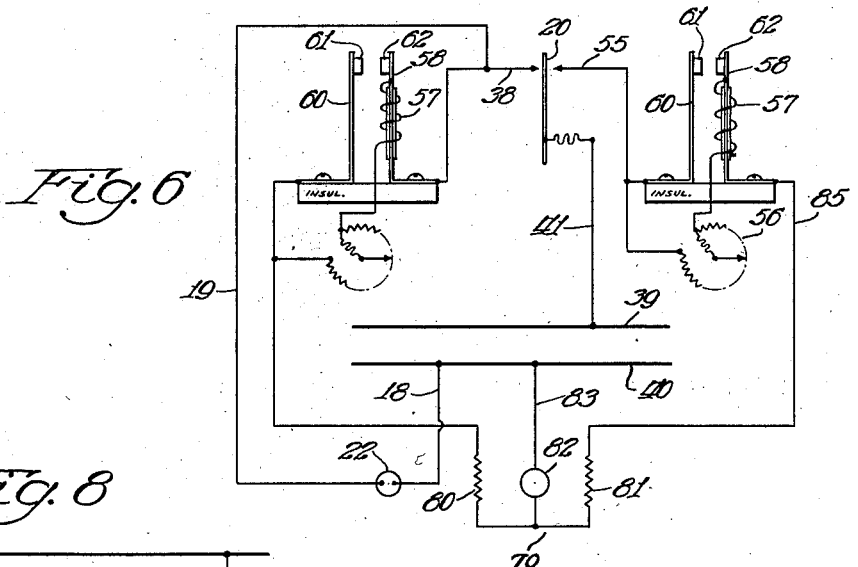
Figure 6 is a fragmentary view of a portion of the wiring diagram shown in Figure 5 and illustrates a modified form of control.

Figure 6 shows a modification of the circuit of Figure 5 showing the electrical circuits with the inclusion of my normally open electrically operated thermal control switch in the circuit of each lead to the two field coils 80 and 81 of the differential motor 79. These normally open electrically operated thermal control switches are the same as the one shown in Figure 3 and already described. Like numbers refer to identical parts. The purpose of the electrically operated thermal control switches is to compensate for lag between changes in fuel in-put and the response of the temperature controller to such changes, by delaying the operation of the slower operating valve to first give the change in fuel made by the fast operating valve time to affect the temperature of the thermocouple element of the temperature controller and operate the pointer 20. Control of the temperature, is therefore handled entirely by the solenoid valve, making small changes in fuel input as long as the demand for fuel is reasonably constant. When the demand gets beyond the combined adjusted range of the solenoid valve and the then normal flow through the motor driven valve pointer 20 will remain in circuit with contact 38 to close the contacts 61 and 62 of the switch in series with lead 84 to operate the motor driven valve intermittently in the direction to increase its opening to give an increased normal flow. When the demand for fuel becomes less than the then normal flow through the motor driven valve pointer 20 will be operated to the right to complete the circuit between it and contact 55 to close the contacts 61 and 62, after a time lag period, to complete the circuit through the lead 85 to the coil 81 and operate the motor driven valve intermittently in the direction to close it, until the flow through the motor driven valve was insufficient to maintain the operating temperature, causing the pointer 20 to swing to the left and break the circuit between it and contact 55.

Figure 7:
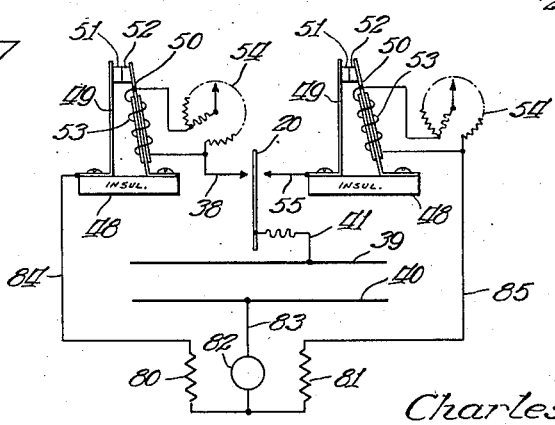
Figure 7 is a fragmentary view illustrating a further modification of the circuit used in the system shown in Figure 5.

Figure 7 shows further modification of the electrical circuits of Figure 5, omitting the solenoid valve, but adding in the circuit of each lead to the field coils of the differential motor my normally closed electrically operated thermal control switch. This switch is the same as the normally closed switch shown in Figure 3 which has already been described. The purpose of these switches is to give the valve 63 operated by the differential motor an action to approximately correspond to the combined action of the solenoid valve and the slow operated motor driven valve. The motor driven valve 63 in this instance has, when operated normally, a faster speed than would be the case when operated in conjunction with the solenoid valve as shown by Figure 5. Upon failure of the temperature to hold at the operating temperature, causing the pointer 20 to swing to the left, contact is made between pointer 20 and contact 38 which completes the circuit through motor coil 80 to operate the motor in the direction to open valve 63. This operating period can be adjusted so it will be of short duration by adjusting the position of the contact of rheostat 54 and the pressure of the contacts 51 and 52 against each other, to first give the valve 63 an opening approximately equivalent to that of the solenoid valve. Contacts 51 and 52 then separate to stop the motor and further opening of the valve. Due to the thermal lag of the switch, contacts 51 and 52 remain open a short interval which gives the increased fuel in-put time to change the temperature of the thermocouple element and operate the pointer 20 to the right to break the circuit between it and the contact 38 under ordinary conditions of operation. If the temperature does not rise and the contact 38 and pointer 20 remain closed longer than the thermal lag period keeps the switch contacts open, motor coil 80 will again be energized to give the valve 63 a still greater opening. This intermittent operation would continue until the circuit between contact 38 and pointer 20 was broken. Now, upon an increase in temperature above the control point contact is completed between the pointer 20 and the contact 55 to complete the circuit to motor coil 81 to operate the motor in the reverse direction and move the valve 63 in the direction to close it in the same manner in which it is opened.

Figure 8:
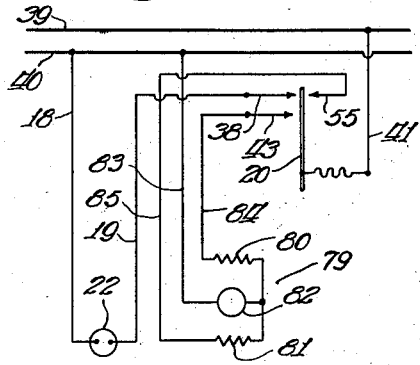
Figure 8 illustrates a further modification in a portion of the system utilized in the construction shown in Figure 5.

Figure 8 shows a slightly modified form of the wiring diagram of the apparatus shown in Figure 5. Like numbers correspond to identical parts. The purpose of wiring in this manner is to operate only the solenoid valve at the exact temperature to be controlled and operate the differential motor driven valve only when the temperature under control goes beyond predetermined limits. For instance, if these limits are adjusted to plus or minus 2 deg. F. and the temperature drops more than 2 deg. F. low the power circuit is completed through contact 43 of the control instrument to operate the motor driven valve in the direction to open it. If the temperature exceeds 2 deg. F. high the power circuit is completed through contact 55 to operate the differential motor driven valve in the direction to close it. Now, if the temperature remains within 2 deg. F. of the exact control temperature the solenoid alone will vary the fuel input; that is, the solenoid will be operated if the temperature under control falls below the exact control temperature to increase the fuel flow, and will be shut off if the temperature exceeds the exact control temperature to reduce the flow of fuel to the furnace.

Figure 9:
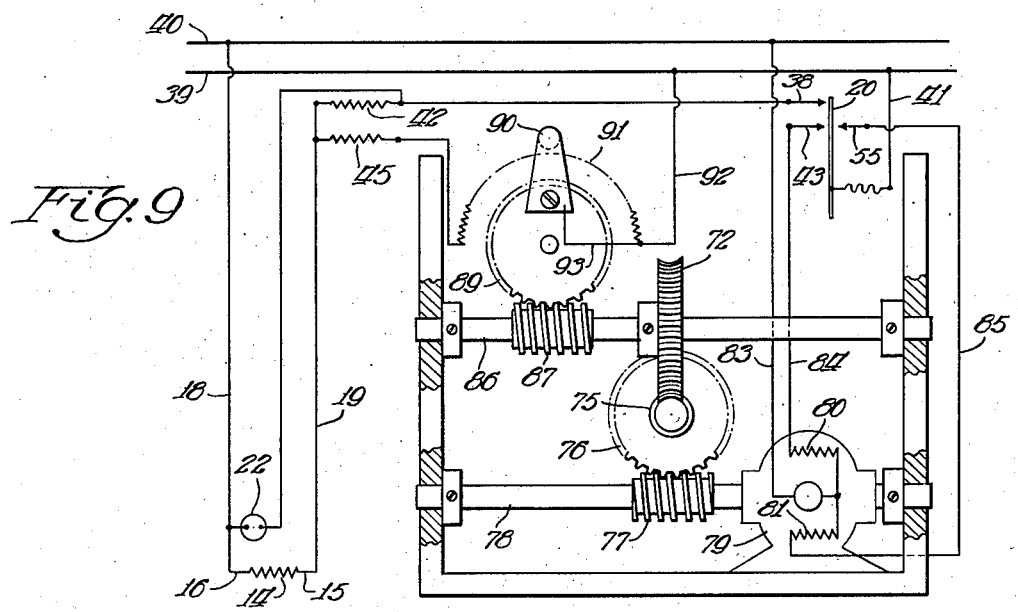
Figure 9 is a somewhat diagrammatic illustration of a further modification in the electrical circuits for operating the control valve shown in Figure 1.

Figure 9 shows a modified arrangement of the electrical circuits for operating the control valves of Figure 1, including a differential motor such as shown in Figure 5 and already described, for operating a variable resistance in circuit with the heater 14 of the thermal expansion valve of Figure 1. Like numbers correspond to identical parts. Upon a drop in temperature below the exact control temperature wanted, pointer 20 completes the power circuit through contact 38 and operates the solenoid valve coil 22 to open the valve and increase the fuel supply to the furnace. At the same time, the circuit is completed through the resistance 42, which when used in this manner is relatively high, and the heater 14. Under ordinary conditions of operation the increase in the opening of valve 3 would be negligible, due to both the high resistance of unit 42 and the short interval of time it would require for the increase in fuel made by the solenoid to cause a temperature rise and break the circuit between pointer 20 and contact 38. If considerable lag does exist between fuel in-put and temperature response, a greater increase in opening of the valve 3 is obtained. Also in the circuit with the valve heater 14 is the low resistance 45 in series with the variable resistance 91. These resistances are continuously in circuit with the valve heater 14 and the power lines 39 and 40 and furnish an electric current through the valve heater 14 depending on the position of the contact 90 on the resistance 91. Lead 92 connected to one terminal of resistance 91 completes the circuit to the power line 39. Connected to the same terminal of resistance 91 is the flexible lead 93 which connects to the contact 90 mounted on the insulating gear 89 and slidable over the resistance 91. The position of contact 90 on resistance 91 remains fixed as long as the temperature to be controlled is within the control limits as predetermined by the adjustment of contact 43 below temperature and contact 55 above temperature, as illustrated in Figure 8. Now, if the temperature drops below the low limit of control, contact is made between the pointer 20 and contact 43 to operate the differential motor and through the shaft 78, worm drive 77, gear 76, worm 75, gear 72, shaft 86, worm 87, and gear 89, operate the contact 90 to the left to decrease the resistance in circuit with resistance 45 and heater 14 to increase the opening of valve 3 an amount depending on how long a time interval the temperature remains below the low limit adjustment of contact 43. If the temperature under control rises above the high limit adjustment, pointer 20 completes the circuit between it and contact 55 to operate the differential motor in the reverse direction to increase the resistance in circuit with resistance 45 and heater 14, to reduce the opening of valve 3.

In many instances, it is desirable to avoid any errors due to temperature changes affecting the thermally controlled switches made up of the bimetallic elements 49, 50, 58, and 60. If the room temperature in which these switches are located varies, it will affect the timing of their opening and closing unless proper provisions are made either by manual adjustment or otherwise to allow for the temperature changes. In order to make these switches practically independent of room temperatures in so far as variations in timing is concerned, I make both of the members 49 and 50 and both of the members 58 and 60 of bimetallic strips and arrange them so that both strips of a particular set will bend in the same direction when heated or cooled. For example, the strips 49 and 50 are set so that an increase in temperature causes them both to bend to the right, and strips 58 and 60 are set so that an increase in temperature will cause them both to bend to the left. The heating coils 53 and 57 heat only the elements 50 and 58 so that a differential in temperature is established between the strip 50 and the strip 49 sufficient to cause separation of the contacts 51 and 52, and similarly a differential in temperature is established between the strips 58 and 60 sufficient to cause contact between the contacts 61 and 62. Any change in the surrounding temperature which is communicated to both strips alike of any pair, therefore, will merely cause the strips to move together in the same direction. Automatic compensation for temperature variations is thus accomplished, and uniformity of time lag between the opening of the contacts carried by the strips and their closing is assured.

From the above description, it is believed that the construction and operation of the devices embodying the invention shown herein will be readily apparent to those skilled in this art. The specific advantages obtained by the present invention have been discussed herein in connection with the detailed construction. The invention in its broader aspect, however, is not limited to the details of construction and electrical arrangement disclosed herein.

Having thus described my invention, what I claim as new and desire to secure by Letters Patent is:

1. Apparatus of the character described for automatically controlling the temperature of a furnace, comprising means responsive to a change in the temperature of said furnace, a combination of slow operating and fast operating means for changing the fuel supply to said furnace in proportion to the sum of the changes made by each means of said combination means, the aforesaid slow operating means including actuating mechanisms connected to and controlled by said temperature change responsive means, said mechanisms operating simultaneously in response to the same change of said temperature responsive means from a predetermined condition.

2. Apparatus of the character described for controlling the flow of fluid fuel to a furnace, comprising control means responsive to the changes in temperature of the furnace, means for making slow changes in the flow of said fluid, means for making fast changes in the flow of said fluid, both of said means including actuating mechanisms connected with said temperature responsive means and operable simultaneously by the same initial change of said responsive means from a predetermined condition.

3. Apparatus of the character described for controlling the flow of fluid fuel to a furnace, comprising means responsive to the changes in fuel demand in said furnace and two valves arranged so that the flow of the aforesaid fluid equals the sum of their individual flows, one of said valves having faster operating characteristics than the other, both of said valves being automatically operable from said responsive means, said slow operating valve comprising an electrically operated thermal expansion valve, means for making a comparatively small change in the valve opening for any deviation from a predetermined condition to be controlled cooperating with means for changing the valve opening to a different normal position to compensate for a different fuel demand, said means for changing said normal position being controllable from a variation in condition beyond the predetermined limits of control variation said last named means being automatically operable upon a change in temperature that exceeds the predetermined limits of temperature control.

4. Apparatus of the character described for automatically controlling the temperature of a furnace, comprising means responsive to a change in the temperature of said furnace, a combination of slow operating and fast operating means for changing the fuel supply to said furnace in proportion to the sum of the changes made by each means of said combination means, the aforesaid combination means being automatically operable from said temperature responsive means, said slow operating means comprising a valve, means for making a comparatively small change in the valve opening for any deviation from the exact temperature under control, cooperating with means for changing the valve opening to a different position for any predetermined position of said temperature responsive means upon changes in temperature outside the predetermined limits of temperature control said last named means being automatically operable upon a change in temperature that exceeds the predetermined limits of temperature control.

5. Apparatus of the character described for controlling the fuel input to a furnace comprising control means responsive to changes in temperature of said furnace, two parallel fuel supply varying devices for varying the fuel input to said furnace, one of said devices being operable to vary the rate of fuel input a predetermined amount when actuated, the other of said devices being operable to vary the rate of fuel input an amount dependent upon the length of time it is actuated, said devices being operatively connected to said control means and actuated by the same response of said control means upon a predetermined change in the temperature to which it responds.

6. Apparatus of the character described for controlling the fuel input to a furnace comprising means responsive to changes in temperature of said furnace, two parallel fuel supply control devices for varying the fuel input to said furnace, one of said devices being operable to vary the rate of fuel input a predetermined amount when actuated, the other of said devices being operable to vary the rate of fuel input an amount dependent upon the length of time it is actuated, said devices being operatively connected to said responsive means and actuated by the same initial movement of said responsive means upon rise and fall in temperature of said furnace in a predetermined operating range.

7. Apparatus of the character described for controlling the flow of fluid fuel to a furnace, comprising means responsive to the changes in fuel demand in said furnace and two valves arranged so that the flow of the aforesaid fluid equals the sum of their individual flows, one of said valves having faster operating characteristics than the other, both of said valves being automatically operable from said responsive means, said slow operating valve comprising an electrically operated thermal expansion valve, means for making a comparatively small change in the valve opening for any deviation from a predetermined condition to be controlled cooperating with means for changing the valve opening to a different normal position for any predetermined temperature position of said fuel demand responsive means to compensate for a different fuel demand, said last named means being automatically operable upon a change in fuel demand that exceeds a predetermined amount.

8. Apparatus of the character described for controlling the flow of fluid fuel to a furnace, said apparatus comprising means responsive to changes in fuel demand in said furnace, means for changing the flow of the aforesaid fluid automatically operable from the initial change of said responsive means, said flow changing means including a valve, means for first causing normal operation of the valve, and means for thereafter causing intermittent operation of said valve upon failure of the normal operation to maintain a given condition, and means for varying the time interval of said intermittent operation.

CHARLES A. MARTIN.